Nov. 28, 1944.     H. W. DENHARD     2,363,840
FILTER
Filed Jan. 3, 1944
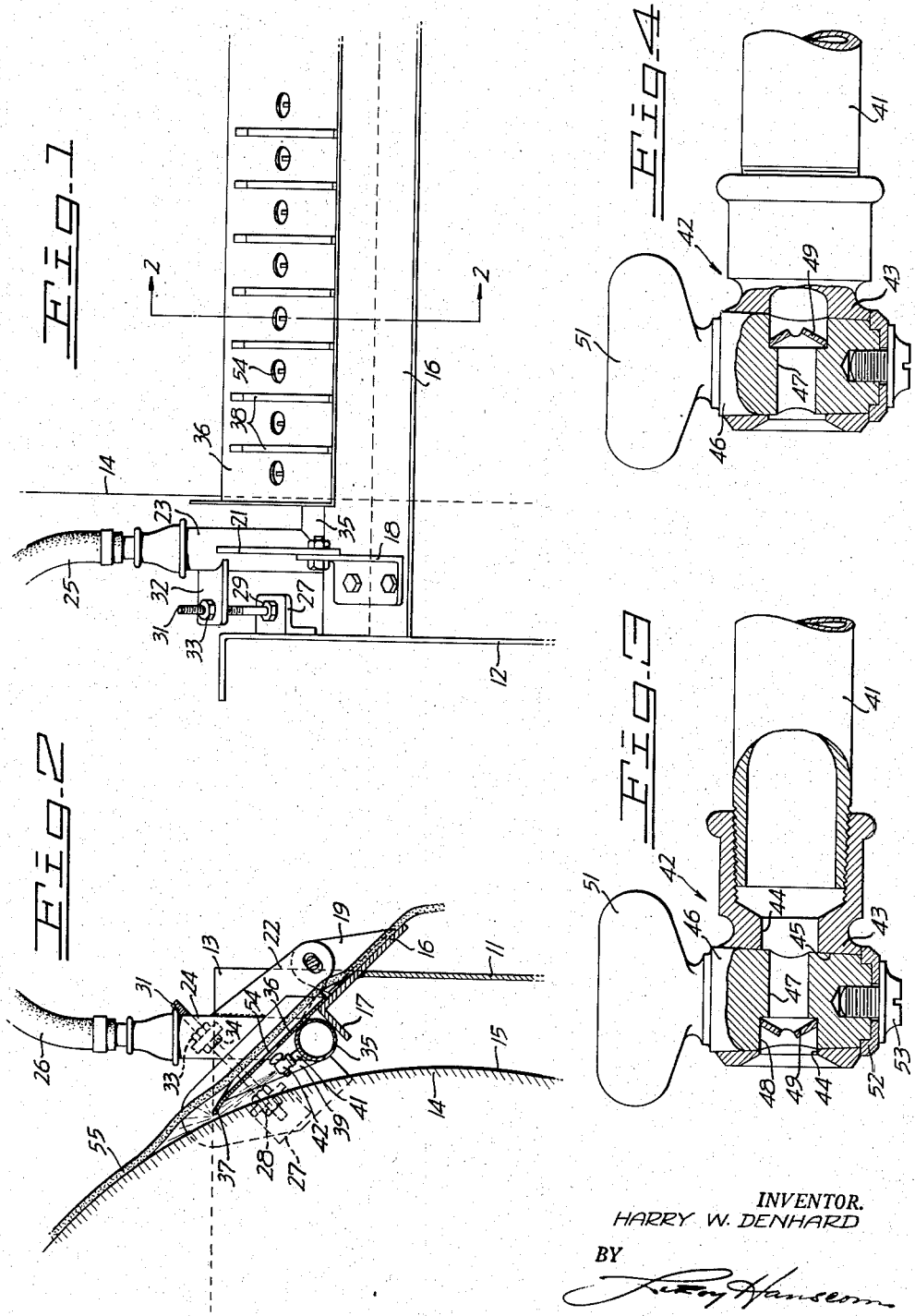
INVENTOR.
HARRY W. DENHARD
BY
ATTORNEY Patented Nov. 28, 1944

2,363,840

UNITED STATES PATENT OFFICE 2,363,840

FILTER

Harry W. Denhard, Oakland, Calif., assignor to Oliver United Filters Incorporated, Oakland, Calif., a corporation of Nevada Application January 3, 1944, Serial No. 516,839

4 Claims. (Cl. 210—201)

This invention relates in general to continuous rotary filters and more specifically to means for discharging filters of this type.

The mechanism resorted to for discharging continuous industrial filters is determined largely by the nature of the material being filtered and the character of the cake which it forms. Fibrous cakes, such as are formed during the filtration of paper pulps, are frequently discharged by a fluid jet or a series of fluid jets impinging on the filter medium beneath a doctor or scraper disposed across the face of the filter medium in the path of the on-coming cake, as shown in the Young Patent No. 2,070,074, of February 9, 1937. The fluid jet serves to lift the sheet of cake from the filter medium, thereby permitting it to slide downwardly over the doctor or scraper. The fluid jets are produced by a series of spray nozzles disposed beneath the doctor in communication with a manifold.

More frequently, this type of discharge is used in connection with rotary drum filters, the continuous operation and capacity of which, like all other types of continuous filters, depend upon a clean and continuous discharge of the cake formed thereon.

In operating filters equipped with dischargers of this type, I have found that frequently one or more of the spray nozzles becomes plugged or stopped up, and that as a consequence those zones or bands of the cake opposite these nozzles are not discharged. If this condition is allowed to prevail, the capacity of the filter is materially reduced, and in some instances the cover or filter medium is torn by the wedging of the cake between the doctor and the filter medium. In any event, it is frequently necessary to shut down the filter, in order to clean out the plugged spray nozzles and to make any repairs required to the filter medium.

In general, then, the object of this invention is the provision of means whereby the nozzles used in this type of discharger may be readily and quickly cleared of foreign matter without the necessity of shutting down the filter, and before any injury has been done to the filter, and before any material reduction in capacity has been incurred.

More specifically, the object of this invention is the provision in a discharger of this general type, of spray nozzles having reversible orifices, and which are accessible through openings in the doctor or scraper.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a partial side elevation of a continuous rotary drum filter provided with a cake discharger embodying the objects of my invention.

Figure 2 is a vertical section taken in the plane indicated by the line 2—2 of Figure 1.

Figure 3 is an enlarged sectional detail of a reversible orifice spray nozzle forming a part of my invention and shown in its normal operative position.

Figure 4 is a section similar to that shown in Figure 3, but with the nozzle orifice shown in its reverse or cleaning position.

As indicated in Figures 1 and 2, the objects of my invention have been embodied in continuous rotary drum filters comprising a filter tank 11 including opposed tank heads 12 and 13. Rotatably disposed within the tank is a filter drum 14 covered with a filter medium 15, which may be of standard construction as generally shown in the Oliver Patent No. 919,628, of April 27, 1909. Preferably the drum 14 is of the sectionalized type, as shown in the Oliver patent, and is provided with an automatic filter valve by means of which each of the filter compartments may be successively subjected to an inwardly directed differential filtering pressure during the cake forming and drying phases of its cycle of operation, and by means of which the inwardly directed differential pressure can be cut off or a reverse blow back pressure applied during the cake discharge phase of its cycle of operation. Since these characteristics are well known in the industry, and of themselves do not constitute my invention, it is deemed unnecessary to here describe them in further detail.

Welded to the tank 11 at the discharge station of the filter is a tank apron 16 formed at its upper edge with a downwardly extending flange 17. Bolted to the upper face of the apron 16 is a pair of opposed clips 18 and 19, each of which forms one element of a doctor hinge. Pivoted to each of the clips 18 and 19 are ribs 21 and 22 forming the complementary elements of doctor hinges. Welded to each of the ribs 21 and 22 are upstanding pipes 23 and 24, and connecting each of these pipes with a suitable source of liquid under pressure are hose sections 25 and 26. Secured to each of the tank heads 12 and 13 is an inwardly extending bracket 27, and adjustably secured to each of these brackets by means of nuts 28 and 29 is a bolt 31. Welded to each of the upstanding pipes 23 and 24 is an outwardly extending ear 32 in general alignment with its associated bracket 27 and to which the bolt 31 is adjustably secured by nuts 33 and 34. Welded to and communicating with the lower ends of the upstanding pipes 23 and 24 is a manifold 35 extending across the face of the filter drum 14 immediately in front of the flange 17.

Welded to the outer face of the manifold 35 is a blade or doctor 36 generally tangential with the filter drum, having its outer end partially overlapping the tank apron 16, and formed with its inner edge 37 downwardly inclined. Secured to the upper face of the doctor is a plurality of longitudinally spaced, transversely extending cake riding bars 38. Welded to the lower face of the doctor is a plurality of longitudinally spaced, transversely extending stiffening ribs 39, which conveniently may be made of box form.

Threaded to the manifold 35 within each of the channels defined by adjacent pairs of the spaced stiffening ribs 39 is a nipple 41, and threaded on each of these nipples is a spray nozzle generally designated by the reference numeral 42.

Each of the nozzles 42 comprises a valve body 43 formed with a longitudinal bore 44 and with a transverse tapered bore 45. Seated within the bore 45 is a valve plug 46 formed with a transverse bore 47 and a counter bore 48 in alignment with the longitudinal bore 44 of the valve body. Disposed within the counter bore 48 is a nozzle tip 49 which in the operative position of the plug valve 46 is outwardly convergent. The valve 46 terminates at its upper end in a wing 51 and is held in its seated position in the valve body by a washer 52 and screw 53.

Formed in the doctor 36 is a plurality of longitudinally spaced holes 54, one in alignment with each of the wings 51 of the valves 46, and through which a suitable wrench may be inserted for reversing the position of any of the valves 46 from their normal operative position, as shown in Figure 3, to their reverse or cleaning position as shown in Figure 4. By adjusting the valves to this latter position, any foreign matter accumulated within the valve may be blown out without the necessity of shutting down the filter, and without disturbing the normal operation of any of the other spray nozzles.

Although as shown in Figure 2, the position of the spray nozzles is fixed with respect to the doctor assembly, the angular position of this assembly with respect to the filter drum 14 can be changed at will by means of the adjusting bolts 31. Preferably this position is such that the doctor blade 36 is generally tangential with the filter drum, so that the spray from the nozzles passes between the edge 37 of the doctor and the drum to lift the cake 55 from the filter medium immediately in advance of the doctor. In this connection, it should be noted that the spray from the nozzles produces an aspirator effect, and that the cake is actually discharged by the combined action of the spray and by air which is drawn past the tip of the doctor due to the low pressure area created at this point.

I claim:

1. In a continuous filter wherein a filter drum is arranged to rotate in a filter tank, and in so doing continuously picks up a layer of solids, a discharger for discharging said cake, comprising: a doctor blade disposed across the face of said filter drum and formed with a plurality of longitudinally spaced openings, said blade being generally tangential with said drum; a plurality of spray nozzles disposed beneath said doctor and each provided with a reversible plug valve accessible through said openings; and means for establishing communication between said nozzles and a source of fluid under pressure.

2. In a continuous filter wherein a filter element is arranged to rotate through a body of material to be filtered and thereby continuously picks up a layer of solids, a discharger for removing said solids from said filter element, comprising: an apertured doctor blade held across the face of said filter element and slightly inclined with respect thereto; a spray nozzle disposed on the under side of said doctor blade and directed toward the forward edge thereof, each of said nozzles being provided with an orifice accessible through one of the apertures in said blade; and means for establishing communication between said nozzles and a source of fluid under pressure.

3. In a continuous filter wherein a filter element is arranged to travel in a closed path through a body of material to be filtered under the influence of a differential filtering pressure, and in so doing picks up a cake of solids, a discharger for removing said cake from said filter element comprising: a doctor blade held adjacent said filter element at a slight angle thereto and formed with a plurality of spaced openings; spray nozzles located opposite said openings in the angle formed by said filter element and said doctor blade; a plug valve associated with each of said spray nozzles and formed with a fluid passageway extending transversely therethrough, said plug being rotatable through 180° so as to reverse the passageway therein end for end; and means for establishing communication between said nozzles and a source of fluid under pressure.

4. In a filter wherein a filter drum is arranged to rotate through a body of material to be filtered, and in so doing to pick up a cake of solids under the influence of a differential filtering pressure, a discharger for removing said cake of solids from said filter drum, comprising: a plurality of spray nozzles aligned across the face of said filter drum and directed substantially tangentially thereto; a plug valve associated with each of said nozzles, said plug valve being formed with a transverse fluid passageway and being rotatable through 180° so as to reverse said passageway end for end; a doctor blade disposed across the face of said drum immediately above said nozzles and formed with openings therein opposite said plug valves; and means for establishing communication between said nozzles and a source of fluid under pressure.

HARRY W. DENHARD.